United States Patent
Jacob

(10) Patent No.: US 9,678,822 B2
(45) Date of Patent: Jun. 13, 2017

(54) REAL-TIME CATEGORIZATION OF LOG EVENTS

(71) Applicant: TATA CONSULTANCY SERVICES LIMITED, Mumbai (IN)

(72) Inventor: Jayadeep Jacob, Trivandrum (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 92 days.

(21) Appl. No.: 14/659,721

(22) Filed: Mar. 17, 2015

(65) Prior Publication Data

US 2016/0196174 A1 Jul. 7, 2016

(30) Foreign Application Priority Data

Jan. 2, 2015 (IN) .............................. 12/MUM/2015

(51) Int. Cl.
*G06F 11/07* (2006.01)

(52) U.S. Cl.
CPC ........ *G06F 11/079* (2013.01); *G06F 11/0781* (2013.01)

(58) Field of Classification Search
USPC .......................................................... 714/48
See application file for complete search history.

(56) References Cited

U.S. PATENT DOCUMENTS

| 7,089,250 | B2 * | 8/2006 | Doganata | G06F 11/0709 |
| 7,283,997 | B1 * | 10/2007 | Howard, Jr. | G06F 17/30702 |
| 7,788,370 | B2 * | 8/2010 | Yugami | G06F 11/3447 709/223 |
| 8,209,567 | B2 | 6/2012 | Cohen et al. | |
| 2008/0215314 | A1 * | 9/2008 | Spangler | G06K 9/6223 704/10 |
| 2010/0332977 | A1 * | 12/2010 | Nelson | G06Q 10/10 715/273 |
| 2011/0185234 | A1 * | 7/2011 | Cohen | G06F 11/3476 714/37 |

(Continued)

OTHER PUBLICATIONS

Gunasekaran et al., "Real-Time System Log Monitoring/Analytics Framework", Oak Ridge National Laboratory, May 2011, 9 pages.

*Primary Examiner* — Kamini Patel
(74) *Attorney, Agent, or Firm* — Hamre, Schumann, Mueller & Larson, P.C.

(57) ABSTRACT

Embodiments for categorizing a real-time log event are described. In one example, a Term Frequency-Inverse Document Frequency (TF-IDF) vector for the log event is computed based on pre-calculated TF-IDF matrix of log corpus and number of new words in log event, where log corpus comprises one or more pre-existing log events, and where the log event is indicative of error message. Further, distance between TF-IDF vector and cluster centroid of each cluster in the log corpus is calculated. Thereafter, cluster having closest cluster centroid is identified from amongst the clusters based on distance between TF-IDF vector and cluster centroid of each of the clusters, where closest cluster centroid is cluster centroid closest to TF-IDF vector. Subsequently, log event is categorized into one or more log categories based on comparison of distance between TF-IDF vector and closest cluster centroid pre-determined silhouette threshold corresponding to cluster with closest cluster centroid.

16 Claims, 3 Drawing Sheets

(56) References Cited

U.S. PATENT DOCUMENTS

| | | | | |
|---|---|---|---|---|
| 2011/0296374 A1* | 12/2011 | Wu | ............... | G06F 17/2715 |
| | | | | 717/104 |
| 2012/0030711 A1* | 2/2012 | Rae | ............... | G06F 17/30268 |
| | | | | 725/46 |
| 2012/0072937 A1* | 3/2012 | Ikeda | ............... | G06F 17/30038 |
| | | | | 725/10 |
| 2012/0192085 A1* | 7/2012 | Lu | ............... | H04L 51/14 |
| | | | | 715/752 |
| 2013/0055268 A1* | 2/2013 | Amershi | ............... | G06F 11/34 |
| | | | | 718/101 |
| 2013/0097706 A1* | 4/2013 | Titonis | ............... | G06F 21/56 |
| | | | | 726/24 |
| 2015/0264085 A1* | 9/2015 | Katayama | ............... | H04L 51/08 |
| | | | | 726/22 |
| 2016/0085521 A1* | 3/2016 | Savliwala | ............... | H04W 4/00 |
| | | | | 717/108 |
| 2016/0098567 A1* | 4/2016 | Yeh | ............... | G06F 21/60 |
| | | | | 726/26 |

\* cited by examiner

REAL-TIME CATEGORIZATION OF LOG EVENTS

TECHNICAL FIELD

The present subject matter relates, in general, to log event management and, in particular, to a system and a method for categorization of log events in real-time.

BACKGROUND

With advancement in science and technology, it has become increasingly difficult to monitor and manage computing systems. The computing systems generate a huge amount of log files on a continuous basis. The log files include information relating to a state of the computing systems, interactions between different components of the computing systems, and abnormality detected in the computing systems. For example, an application running on a computing system may generate a log file, and a person can refer to the log file during maintenance procedures or in an event of a failure. Each log file further includes one or more log events. A log event may be defined as a pre-defined message, such as a pre-defined alert message generated by an application running on a computing system, a process failure message generated by an operating system of the computing system, a disk overflow error message, and a network failure message. Analyzing the log events provides useful insights for monitoring and managing the computer systems, and also for identifying problems and source of the problems in the computing systems.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which.

DETAILED DESCRIPTION

Figure 1:
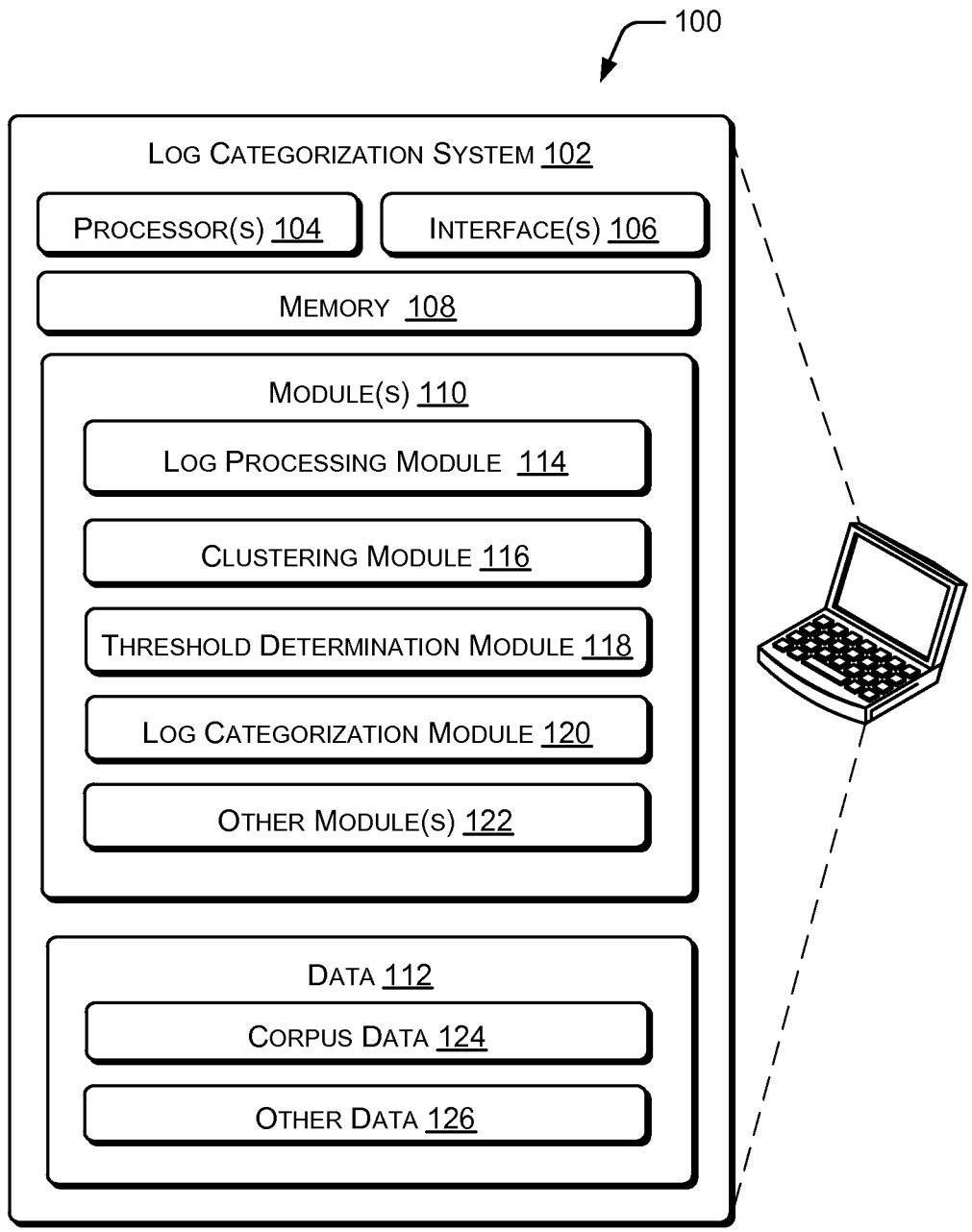
FIG. 1 illustrates a computing environment implementing a log categorization system, according to an embodiment of the present subject matter.

Every day terabytes of log events are generated and streamed from computing systems on a continuous basis. The log events generated in real-time are generally monitored by operators of the computing systems, such as an Information Technology (IT) support staff to detect abnormalities in the computing systems, if any. An operator of a computing system may perform one of three possible actions in response to receiving a real time log event. First action being skipping the log event if the log event is relatively insignificant. Second action includes correlating the log event with pre-existing log categories including historical log events, and associating the log event with trouble tickets from the previous instances associated with the historical log events, and responding accordingly. In one example, categorization of the log events to create the pre-existing log categories may also be performed by the operator. Further, if the log event is a new category that has not occurred or observed before, then the operator may perform the third action, i.e., investigate the log event before responding. In one example, the operator may raise a new trouble ticket for the log event.

However, in a highly productive environment, a large number of log events are generated per second. Further, log events have a variety of formats. Even within a specific log category, the log events may syntactically differ. For example, syntax of the log events within a log category may not match. Also there may be thousands of log categories in a computing system.

According to an example, a log category X having log events $X_1$ and $X_2$, and a log category Y having logs events Y1 and Y2 are depicted in Table 1 (provided below).

TABLE 1

| Log Category | Log Event | Log Description |
| --- | --- | --- |
| X | $X_1$ | [com.refdata.a2.impl.AccountCreationBuilder] Invalid company code '0342' for account '4590XDCD6' with statement id 'AU#BbC0IlQ9-E1MVPhhwA' |
|  | $X_2$ | [com.refdata.a2.impl.AccountCreationBuilder] Invalid company code '2391' for account '03DC0485' with statement id 'AU#CRUTsRpmXq-5xW1pHA' |
| Y | $Y_1$ | [com.ovcs.OvcsSubscriber.bcilAD] Unexpected disconnect of connection bcilConnection1[tcp://sydbcil4test1:12835] State: STREAMING -> CLOSED |
|  | $Y_2$ | [com.ovcs.OvcsSubscriber.options] Unexpected disconnect of connection optConnection1[tcp://sydbcil5dev1:39222] State: STREAMING -> CLOSED |

As shown in the Table 1 above, log category X deals with invalid combination of the company code, statement IDs, and account IDs, and log category Y deals with an unexpected disconnection in network due to shut down of one or more servers. Further, as may be seen in the table 1, within log category X, company codes, account identifiers (IDs), and statement IDs of the log events $X_1$ and $X_2$ differ. Further, within log category Y, server names, connection names, port numbers, and class names from the libraries of the log events $Y_1$ and $Y_2$ differ.

Since there are terabytes of log events being generated daily, there may be thousands of log categories, and different formats and patterns of log events in each log category. As a result, it may become difficult for the operators to perform the manual analysis of the log events. Also, the operators may perform the categorization and log analysis using explicit programming, for example, regex pattern matching. However, since there are thousands of log events and different patterns of log events, use of explicit programming may not be feasible. As a result, terabytes of log events generated by the computing systems may be left unattended. Furthermore, the operators may cluster the log events based on conventional divisive clustering technique or agglomerative clustering technique, such as Hierarchical clustering technique. However, as explained above, a set of log events is typically a high volume, high dimensional, but sparse dataset. This renders the clustering techniques too slow for industrial use. Moreover, real-time log events are typically streaming data with high velocity. Thus, it may not be feasible to associate large computations with individual log events. For example, re-clustering the real-time log events along with the historical log events to identify new log categories may not be practical. Therefore, the manual categorization of the log events and analysis of the log events performed by the operators is time consuming, tedious, costly, and prone to errors.

Various systems for categorizing the log events automatically have been developed in the past few years. Some conventional systems may use non-learning mode to identify patterns of the log events. However, these systems may not work efficiently when processing heterogeneous log events that are varied in format, length, and content. Further, in some cases, prior configuration may be required for categorizing new formats of log events. In one example, these conventional systems may use pre-defined distance thresholds and a first new instance of a different log category as a template for further pattern matching. These predefined thresholds may be bound to be inaccurate for real log events. Moreover, some conventional systems may use text based analytical techniques for categorizing the log events. For example, these systems may use clustering techniques for categorizing the log events. These systems are not computationally efficient to be used for real-time slog events.

In accordance with the present subject matter, a system and a method for categorizing log events in real-time are described. In an implementation, a real-time log event is categorized into a log category. In one example, the log category may be one of a pre-existing log category and a new log category. Further, the real-time log event, hereinafter referred to as a log event, may be indicative of an error message. Examples of the log event include a disk overflow error message, a network failure message, and a pre-defined alert from a user application.

According to an implementation, a Term Frequency-Inverse Document Frequency (TF-IDF) vector for a log event is calculated based on a pre-calculated TF-IDF matrix and a number of new words used in the log event. The log corpus comprises one or more pre-existing log events. Further, a centroid matrix for the log event is determined based on a pre-determined centroid matrix of the log corpus and the number of new words in the log event. In other words, the pre-determined centroid matrix of the log corpus is adapted to suit the dimensions of the TF-IDF vector of the real-time log event to determine the centroid matrix. The pre-determined centroid matrix may be determined based on a number of clusters in the log corpus. Subsequently, a distance between the TF-IDF vector and a cluster centroid of each of the clusters is calculated. Thereafter a cluster having a closest cluster centroid, i.e., a cluster centroid closest to the TF-IDF vector is identified based on the distance between the TF-IDF vector and the cluster centroid of each of the clusters. Finally, the log event is categorized into a log category based on a comparison of the distance between the TF-IDF vector and the closest cluster centroid of the cluster with a pre-determined silhouette threshold corresponding to the cluster.

For the purpose of categorizing the log event into the log category, initially the log corpus is clustered to determine one or more log categories. The log event can then be accurately categorized through the system using the one or more log categories. In an implementation, the categorization of the log event into the log category is performed in real-time, however, the clustering of the log corpus may or may not be performed in real-time.

In an implementation, initially, log corpus may be received from a log source. The log corpus comprises one or more log events. The one or more log events may be referred to as pre-existing log events hereinafter. Further, the log source may include, but is not limited to, an application running on a computing system, a system process, a logging engine, a logging server, and the like. In one example, the log corpus may be understood as a historical log archive. Subsequently, the log corpus is processed to remove insignificant data from each of the one or more pre-existing log events. Examples of the insignificant data include timestamps, digits, and special characters.

Thereafter, a TF-IDF matrix of the log corpus is computed based on a number of pre-existing log events in the log corpus and a number of words in the log corpus. The TF-IDF matrix indicates frequencies of individual words in each pre-existing log event and frequencies of words in the entire log corpus. Once the TF-IDF matrix is computed, a cluster model is generated based on the TF-IDF matrix. The cluster model is indicative of the number of clusters corresponding to the log corpus. In one example, a cluster may be indicative of a log category.

According to an implementation, thereafter, a centroid matrix of the log corpus is determined based on the number of clusters in the cluster model and the number of words in the log corpus. The centroid matrix of the log corpus may be referred to as pre-determined centroid matrix hereinafter. Subsequently, a cluster radius and a silhouette width of each cluster are calculated. In one example, a cluster radius of a cluster is calculated based on a distance between a cluster centroid of the cluster and a farthest point within the cluster. Further, a silhouette width of the cluster is indicative of compactness of the cluster. Thereafter, a silhouette threshold is determined for each cluster based on the corresponding cluster radius and the corresponding silhouette width. Once the one or more pre-existing log categories, the TF-IDF matrix, the pre-determined centroid matrix, and the silhouette threshold for each cluster are determined, these are stored in a database.

In an implementation, for categorizing a real-time log event into a log category, the log event is received from a log source. Thereafter, the log event is processed to remove insignificant data from the log event. Subsequently, a TF-IDF vector for the real-time log event is computed based on the pre-calculated TF-IDF matrix of the log corpus, to categorize the log event into the log category. As described above, the log corpus comprises one or more pre-existing log events.

Subsequently, a centroid matrix for the log event is determined based on the pre-determined centroid matrix of the log corpus and the number of new words in the log event. In other words, the pre-determined centroid matrix of the log corpus is adapted based on the number of new words in the real-time log event to suit the dimensions of the TF-IDF vector of the real-time log event to determine the centroid matrix. Further, a distance between the TF-IDF vector of the real-time log event and a cluster centroid of each of the clusters is calculated and from amongst the clusters, a cluster having a closest cluster centroid, i.e., a cluster centroid closest to the TF-IDF vector of the real-time log event is identified based on the distance between the TF-IDF vector and the cluster centroid of each of the clusters. Finally, the log event is categorized into the log category based on a comparison of the distance between the TF-IDF vector of the real-time log event and the closest cluster centroid of the cluster with the pre-determined silhouette threshold corresponding to the cluster. The log category includes a pre-existing log category corresponding to the cluster and a new log category.

According to the present subject matter, since the pre-existing log events are categorized into a plurality of log categories and stored in the database, it becomes easy to query the organized pre-existing log events for performing categorization on the received real-time log event. Further, since the real-time log event is not categorized manually, the categorization of real-time log event is free from errors. Moreover, substantially less time, cost, and effort is consumed in categorization of real-time log event.

The following disclosure describes system and method for real-time categorization of log events. While aspects of the described system and method can be implemented in any number of different computing systems, environments, and/or configurations, embodiments for real-time categorization of log events are described in the context of the following exemplary systems and methods.

FIG. 1 illustrates a computing environment 100 implementing a log categorization system 102, according to an embodiment of the present subject matter. In said embodiment, the log categorization system 102 is provided for categorizing a real-time log event into a log category. In one example, the log category may be one of a pre-existing log category and a new log category. Further, the real-time log event, hereinafter referred to as a log event, may be indicative of an error message. Examples of the log event include a disk overflow error message, a network failure message, and a pre-defined alert from a user application.

The log categorization system 102 may be implemented in a variety of computing systems, such as a laptop computer, a desktop computer, a notebook, a smartphone, a tablet, a workstation, a mainframe computer, a server, a network server, and the like. According to an implementation, the log categorization system 102 includes processor(s) 104, interface(s) 106, and memory 108 coupled to the processor(s) 104. The processor(s) 104 may be implemented as one or more microprocessors, microcomputers, microcontrollers, digital signal processors, central processing units, state machines, logic circuitries, and/or any devices that manipulate signals based on operational instructions. Among other capabilities, the processor(s) 104 may be configured to fetch and execute computer-readable instructions stored in the memory 108.

The memory 108 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the interface(s) 106 may include a variety of software and hardware interfaces, for example, interfaces for peripheral device(s), such as a product board, a mouse, an external memory, and a printer. Additionally, the interface(s) 106 may enable the log categorization system 102 to communicate with other devices, such as web servers and external repositories. The interface(s) 106 may also facilitate multiple communications within a wide variety of networks and protocol types, including wired networks, for example, LAN, cable, etc., and wireless networks, such as WLAN, cellular, or satellite. For the purpose, the interface(s) 106 may include one or more ports.

The log categorization system 102 also includes module(s) 110 and data 112. The module(s) 110 include, for example, a log processing module 114, a clustering module 116, a threshold determination module 118, a log categorization module 120, and other module(s) 122. The other modules 122 may include programs or coded instructions that supplement applications or functions performed by the log categorization system 102. The data 112 may include corpus data 124 and other data 126. In one example, the corpus data 124 may include data relating to log corpus and one or more pre-existing log categories. Further, the other data 126, amongst other things, may serve as a repository for storing data that is processed, received, or generated as a result of the execution of one or more modules in the module(s) 110.

Although the data 112 is shown internal to the log categorization system 102, it may be appreciated by a person skilled in the art that the data 112 can also be implemented external to the log categorization system 102, wherein the data 112 may be stored within a database communicatively coupled to the log categorization system 102. Further, the corpus data 124 stored in the database may be retrieved whenever the log event is to be categorized into the log category by the log categorization system 102. Furthermore, the corpus data 124 contained within such external database may be periodically updated. For example, new corpus data may be added into the database, existing corpus data may be modified, or non-useful corpus data may be deleted from the database.

In one embodiment of the present subject matter, for the purpose of categorization of the log event into the log category, log corpus is initially clustered into one or more log categories and then the log event is then categorized a new log category or into pre-existing log category from amongst the one or more pre-existing log categories, through the log categorization system 102. The clustering of the log corpus may not be performed in real-time; however, the categorization of the log event into the log category is performed in real-time through the log categorization system 102.

In an implementation, for clustering the log corpus into one or more log categories, the log processing module 114 may receive log corpus from a log source. The log source may include, but is not limited to, an application running on a computing system, a system process, a logging engine, a logging server, and the like. As may be understood by a person skilled in the art, log files containing a plurality of log events get archived continuously. This historical log archive may be referred to as the log corpus. Accordingly, the log corpus comprises one or more pre-existing log events.

Subsequently, the log processing module 114 may process the log corpus to remove insignificant data from each of the one or more pre-existing log events. Examples of insignificant data include timestamps, digits, and special characters. The pre-existing log events may have disparate formats. However, the pre-existing log events may have common characteristics. For example, the pre-existing log events may include timestamps, and may be composed by upper case letters, lower case letters, digits, and special characters. Further, these characteristics may be insignificant data. Therefore, the log processing module 114 may process the log corpus to remove the insignificant data from each of the one or more pre-existing log events. Accordingly, substantially less time, cost, and resources are consumed when the processed log corpus is further processed. For removal of the timestamp from the log corpus, the log processing module 114 may remove timestamp information from each of the one or more pre-existing log events. For removal of the digits, the log processing module 114 may remove the digits in the pre-existing log events. Further, the log processing module 114 may replace each digit in the pre-existing log events with a special character.

In case the pre-existing log events in the log corpus are in upper case, the log processing module 114 may convert the pre-existing log events to lower case to bring uniformity. Moreover, for removal of the special characters, the log processing module 114 may remove all the special characters from the pre-existing log events, such as punctuations and may retain only the letters. According to an example, the log processing module 114 may also remove stop words, such as what, a, the, any, and the like from the pre-existing log events as these stop words do not carry any significant information according to one implementation, the log categorization system 102 clusters the processed log corpus into one or more log categories based on which the real-time log event may be categorized.

In one implementation, to obtain the one or more log categories, the clustering module 116 may compute a Term Frequency-Inverse Document Frequency (TF-IDF) matrix of the log corpus based on a number of pre-existing log events in the log corpus and a number of words in the log corpus. In one example, the clustering module 116 computes the TF-IDF matrix based of a number of words in the log corpus excluding the stop words described above. The TF-IDF matrix indicates frequencies of individual words in each pre-existing log event and frequencies of words in the entire log corpus. In the context of the present subject matter, the TF-IDF matrix is mathematically represented by expression (1) provided below.

$$T_{n \times m} \qquad (1)$$

where n represents the number of pre-existing log events in the log corpus and m represents a total number of unique words in the log corpus.

To compute the TF-IDF matrix, initially, the clustering module 116 calculates term frequency of each word in each pre-existing log event based on equation (2) provided below.

$$tf_{ij} = \begin{cases} 0, & \text{if } m_j = 0 \\ \dfrac{f_{ij}}{m_j}, & \text{if } m_j > 0 \end{cases}; \qquad (2)$$

for $j = 1, 2, \ldots, n$ and $i = 1, 2, \ldots, m$ where $tf_{ij}$ represents term frequency of $i^{th}$ word in $j^{th}$ pre-existing log event, $f_{ij}$ represents frequency of $i^{th}$ word in $j^{th}$ pre-existing log event normalized by diving it by $m_j$, $m_j$ represents a number of words in $j^{th}$ pre-existing log event, n represents a number of pre-existing log events in the log corpus, and m represents a number of unique words in the log corpus.

Further, the clustering module 116 computes inverse document frequency based on equation (3) provided below.

$$idf_i = \begin{cases} 0, & \text{if } n_i = 0 \\ \log \dfrac{n}{n_i}, & \text{if } n_i > 0 \end{cases} \qquad (3)$$

where $idf_{ij}$ represents inverse document frequency of $i^{th}$ word and $n_i$ represents a number of pre-existing log events where the $i^{th}$ word appears in the entire log corpus.

Thereafter, the clustering module 116 determines TF-IDF vector for each pre-existing log event. The $j^{th}$ pre-existing log event $L_j$ may be mathematically represented by expression (4) provided below.

$$L_j = tf_{1j} \times idf_1, tf_{2j} \times idf_2, tf_{3j} \times idf_3, \ldots tf_{Mj} \times idf_M \qquad (4)$$

Thus, the TF-IDF matrix is mathematically represented by n×m matrix. Further, the clustering module 116 partitions the pre-existing log events in the log corpus into one or more log categories. According to an implementation, the clustering module 116 applies the TF-IDF matrix as an input to a clustering algorithm, such as a spherical K-means clustering algorithm to generate a cluster model. In one example, the cluster model is indicative of a number of clusters corresponding to the log corpus, where a cluster is indicative of a log category.

Subsequently, the clustering module 116 determines the centroid matrix of the log corpus based on the number of clusters in the cluster model and the number of unique words corresponding to the dimensions of the TF-IDF matrix in the log corpus. In an implementation, the clusters may be understood as log categories. According to an example, the clustering module 116 may determine the centroid matrix based on the number of words in the log corpus excluding the stop words. In the context of the present subject matter, the centroid matrix is mathematically represented by expression (5) provided below.

$$C_{k \times m} \qquad (5)$$

where k represents the number of clusters in the log corpus and m represents a total number of unique words in the log corpus.

According to an implementation, the clustering module 116 may store the TF-IDF matrix and the centroid matrix in the corpus data 124.

Thereafter, the threshold determination module 118 calculates a cluster radius and a silhouette width of each cluster. In an example, a cluster radius of a cluster is calculated based on a distance between a cluster centroid of the cluster and a farthest point in the cluster. In other words, a cluster radius of a cluster is a maximum distance among distances of each of the points in the cluster and the cluster centroid of the cluster. Further, a silhouette width of a cluster is indicative of compactness of the cluster. In an example, a silhouette width of a cluster is a measure of how well an object lies within the cluster and how distant is each object from its closest neighboring cluster. The silhouette width may vary from −1 to 1.

According to an implementation, the threshold determination module 118 calculates a cluster radius of a cluster based on equation (6) provided below:

$$CR_i = \max\{\text{dist}(l_j, \mu_i)\}; \text{ for } l_j \epsilon C_i,$$

$$l_j \epsilon N, \text{ for } j=1,2,\ldots,n_i$$

$$C_i \epsilon C, \text{ for } i=1,2,\ldots,k \qquad (6)$$

where $CR_i$ represents cluster radius of cluster $C_i$, $l_j$ represents $j^{th}$ pre-existing log event, $\mu_i$ represents centroid or mean of pre-existing log events in $C_i$ cluster or category, dist $(l_j, \mu_i)$ represents one of Euclidean distance and Cosine distance between $l_j$ and $\mu_i$, k represents the number of clusters or log categories in the log corpus, $n_i$ represents the number of pre-existing log events in the cluster $C_i$ log corpus, and N represents a set of pre-existing log events or the log corpus and C represents a set of clusters.

Further, in one implementation, the threshold determination module 118 calculates a silhouette width of a cluster based on equations (7), (8), and (9) provided below:

$$SW_i = \frac{1}{n_i} \sum_{j=1}^{n_i} \frac{b_j^i - a_j^i}{\max\{b_j^i, a_j^i\}} \qquad (7)$$

where $$a_j^i = \frac{1}{n_i - 1} \sum_{z=1, z \neq j}^{n_i} \text{dist}(l_j^i, l_z^i); \qquad (8)$$

for $j = 1, 2, \ldots, n_i; l_j^i \in C_i; l_z^i \in C_i$

-continued $$b_j^i = \min_{\substack{r=1,2\ldots k \\ r \neq i}} \left\{ \frac{1}{n_r} \sum_{z=1}^{n_r} dist(l_j^i, l_z^r) \right\};$$ (9)

for $j = 1, 2, \ldots, n_i$; $l_j^i \in C_i$; $l_z^r \in C_r$ where $SW_i$ represents silhouette width of the cluster $C_i$, $n_i$ represents the number of pre-existing log events in the cluster $C_i$, $a_j^i$ represents average distance between $j^{th}$ pre-existing log event in the cluster $C_i$ and remaining pre-existing log events in the same cluster, and $b_j^i$ represents minimum average distance between $j^{th}$ pre-existing log event in the cluster $C_i$ and remaining pre-existing log events in the remaining other clusters.

Subsequently, the threshold determination module 118 determines a silhouette threshold for each cluster based on the corresponding cluster radius and the corresponding silhouette width. According to an implementation, the threshold determination module 118 determines the silhouette threshold based on equation (10) provided below:

$$ST_i = CR_i[1+SW_i]; \text{ for } i=1,2,\ldots,k$$ (10)

where $ST_i$ represents silhouette threshold of the cluster $C_i$, k represents a number of clusters or log categories, $CR_i$ represents cluster radius of cluster $C_i$, and $SW_i$ represents silhouette width of the cluster $C_i$.

According to an example, the silhouette threshold may be understood as an ideal dynamic critical distance measure. If a cluster has with high average inter cluster distance and low within cluster distance, then the cluster may have a positive silhouette width. Conversely, for a cluster with low average inter cluster distance and high within cluster distance, the cluster may have a negative silhouette width. Further, it may be understood that every log category or a cluster is associated with a respective silhouette threshold. According to an implementation, the threshold determination module 118 may store the silhouette thresholds, cluster radius, and silhouette widths in the corpus data 124. The manner in which the log categorization system 102 categorizes a real-time log event into pre-existing log category or a new log category is described henceforth.

In an implementation, for categorizing the real-time log event, the log processing module 114 receives the log event from a log source. Examples of the log source may include, but are not limited to, an application running on a computing system, a system process, a logging engine, a logging server, and the like. Subsequently, the log processing module 114 may process the log event to remove insignificant data from the log event. Examples of insignificant data include timestamps, digits, and special characters.

Thereafter, the clustering module 116 may compute a TF-IDF vector for the real-time log event. For computing the TF-IDF vector, the clustering module 116 may retrieve the pre-determined TF-IDF matrix of the log corpus from the corpus data 124. The clustering module 116 computes the TF-IDF vector of the real-time log event based on the pre-calculated or pre-determined TF-IDF matrix and a number of new words in the real-time log event. The number of new words may not include the stop words. As would be understood, the log event may comprise a subset of the existing or current words from the log corpus or a set of new words that is not present in the log corpus or a combination of both. In the context of the present subject matter, the clustering module 116 matrix computes the TF-IDF vector for the real-time log event based on equations (11), (12), (13), (14), and (15) provided below.

$$N = \{l_1, l_2, l_3, \ldots, l_n\}$$ (11)

where N represents the set of pre-existing log events in the log corpus, l represents an individual pre-existing log event, and n represents a number of pre-existing log events in the log corpus.

$$M = \{w_1, w_2, w_3, \ldots, w_m\}$$ (12)

where M represents the set of selected words in the set of pre-existing log events, w represents the individual words, and m represents a total number of unique words in the log corpus $$|M| = m$$ (13)

$$|N| = n$$ (14)

$$M^R = \{w_1^R, w_2^R, w_3^R, \ldots, w_r^R\}, \text{ for } i=1,2,\ldots,r$$ (15)

where $M^R$ represents the set of selected words in the real-time log event, $w_i^R$ represents $i^{th}$ individual word in the real-time log event, r represents a number of words in the real-time log event.

According to an implementation, the calculation of the TF-IDF vector for the real-time log event is depicted in Table 2 (provided below).

TABLE 2

| | |
|---|---|
| Step 1: | Initialize $T^R_{1 \times m}$ matrix; {With same columns as $T_{n \times m}$} |
| Step 2: | For each word $w^R_i \in M^R$; i = 1, 2, 3 . . . r |
| Step 3: | If $w^R_i \notin M$ then |
| Step 4: | M ← {M, $w^R_i$}; {Add the new word to vocabulary} |
| Step 5: | m ← m + 1 {increase vocabulary set size by 1} |
| Step 6: | $T^R_{1m} \leftarrow \dfrac{\text{count }(w_i^R)}{r} \times \dfrac{\log(n+1)}{1}$ |
| Step 7: | else |
| Step 8: | Find j where $w_j = w^R_i$ ; $w^R_i \in M^R$, $w_j + \in M$ |
| Step 9: | $c(w^R_i)$ = row count $(T_{n \times m})$ | $T_{pj} \neq 0$; p = 1, 2, 3 . . . n |
| Step 10: | $T^R_{1j} \leftarrow \dfrac{\text{count }(w_i^R)}{r} \times \dfrac{\log(n+1)}{c(w_i^R)+1}$ |
| Step 11: | end if |
| Step 12: | end for |

In the context of the present subject matter, the TF-IDF vector is mathematically represented by expression (16) provided below and is calculated as shown in the table 2.

$$T_{1 \times (m+\Delta m)}^R$$ (16)

where m represents a total number of words in the log corpus and $\Delta m$ represents a number of new words excluding the stop words in the real-time log event.

According to an implementation, the TF-IDF vector "$T_{1 \times m}^R$" of the real-time log is initialized. The TF-IDF vector has the same number of columns as the pre-determined TF-IDF matrix of the log corpus, but with only 1 row. Thereafter, the clustering module 116 iterates over each word in the real-time log event in the step 2. If the word is not present in the log corpus, the clustering module 116 adds the word in the TF-IDF matrix as depicted in steps 4 and 5. The TF-IDF entry for that element is calculated in the step 6. In one example, the document size to calculate the IDF is (n+1) i.e. the log corpus size+the real-time log event. The denominator is 1 as this word is not found in any other existing log event. If the word is present in the log corpus vocabulary, the clustering module 116 determines the column index of the word in the log corpus vocabulary. Thereafter, the clustering module 116 identifies the count of rows that has non zero entries for the word in the pre-determined TF-IDF matrix of the log corpus in the step 9. The clustering module 116 calculates the IDF as given in the step 10 based on this count.

Subsequently, the clustering module 116 may determine a centroid matrix for the log event based on the pre-determined centroid matrix of the log corpus and the number of new words in the log event. In other words, the pre-determined centroid matrix of the log corpus is adapted based on the number of new words in the real-time log event to suit the dimensions of the TF-IDF vector of the real-time log event to determine the centroid matrix. According to an implementation, the clustering module 116 may adapt the centroid matrix to suit the TF-IDF vector of the log event. The dimensions of the adapted pre-determined centroid matrix is mathematically represented by expression (17) provided below.

$$k \times (m + \Delta m) \qquad (17)$$

where k represents the number of clusters or the number of pre-existing log categories, m represents a total number of unique words in the log corpus, and $\Delta m$ represents a number of new words excluding the stop words in the real-time log event.

Thereafter, the log categorization module 120 may calculate a distance between the TF-IDF vector and a cluster centroid of each of the clusters. Further, the log categorization module 120 may identify, from amongst the clusters, a cluster having a closest cluster centroid based on the distance between the TF-IDF vector and the cluster centroid of each of the clusters. The closest cluster centroid is a cluster centroid closest to the TF-IDF vector. In one example, the log categorization module 120 selects the centroid, from the adapted k centroid set, with lowest dissimilarity to the log event as its closest centroid.

Further, the log categorization module 120 categorizes the real-time log event into a log category based on a comparison of the distance between the TF-IDF vector and the closest cluster centroid of the cluster with a pre-determined silhouette threshold corresponding to the cluster. As described above, the log category is one of a pre-existing log category, from amongst the pre-existing log categories, and a new log category. According to an implementation, the log categorization module 120 categorizes the log event into the pre-existing log category corresponding to the cluster when the distance between the TF-IDF vector and the closest cluster centroid of the cluster is less than the pre-determined silhouette threshold corresponding to the cluster. Further, the categorization module 120 categorizes the log event a new log category when the distance between the TF-IDF vector and the closest cluster centroid is greater than the pre-determined silhouette threshold corresponding to the cluster.

Figure 2A:
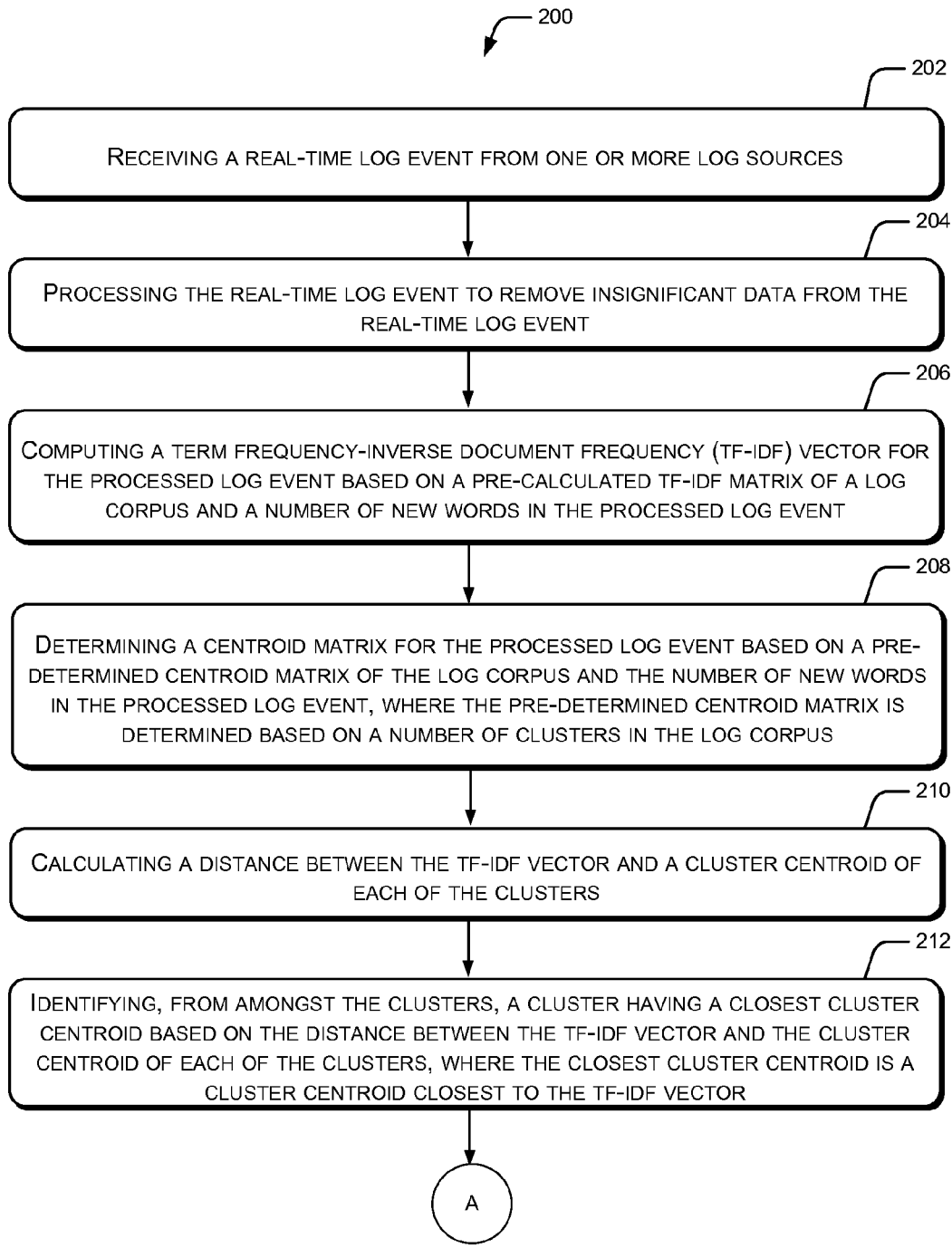
FIGS. 2A and 2B illustrate a method for categorizing a log event in real-time, according to an embodiment of the present subject matter.
Figure 2B:
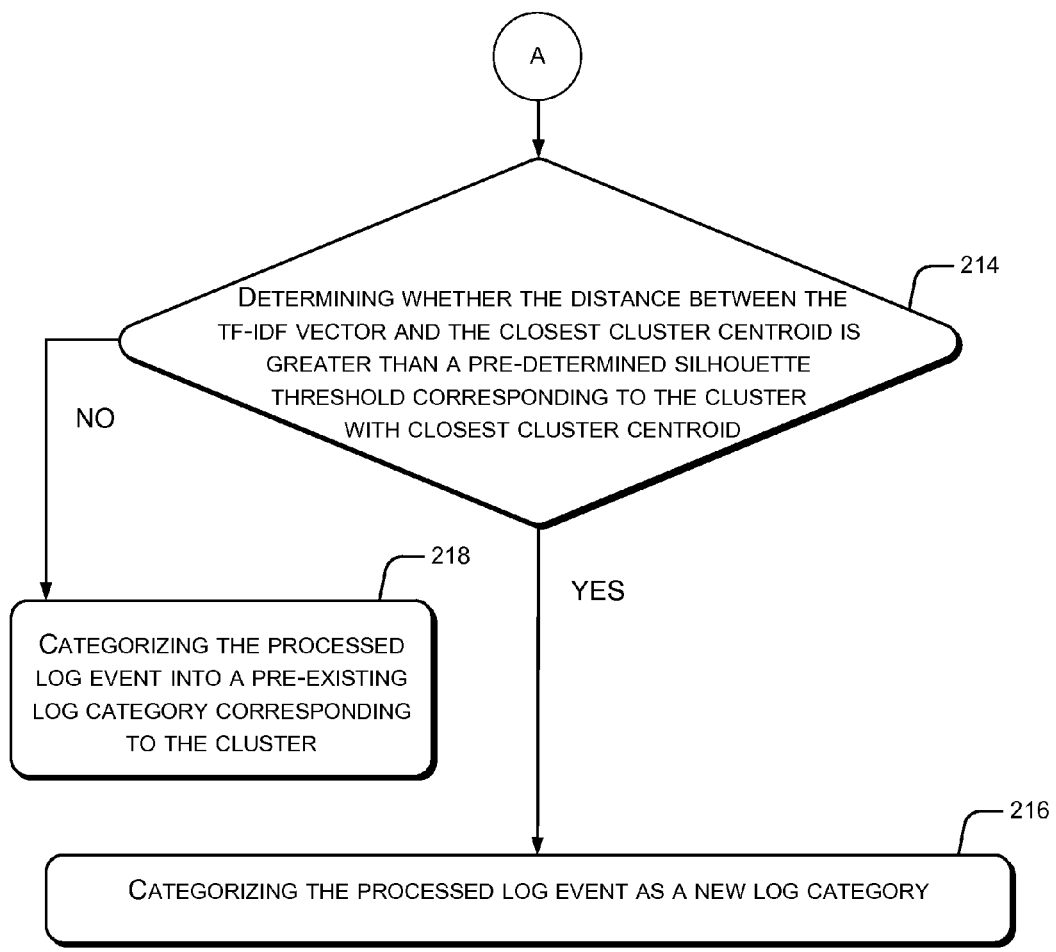

FIGS. 2A and 2B illustrate a method 200 for categorizing a log event in real-time, according to an embodiment of the present subject matter. The method 200 is implemented in the log categorization system 102. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network.

The order in which the method is described is not intended to be construed as a limitation, and any number of the described method blocks can be combined in any order to implement the method, or an alternative method. Furthermore, the method can be implemented in any suitable hardware, software, firmware or combination thereof.

At block 202, the method 200 includes receiving a real-time log event from one or more log sources. Examples of the one or more log source may include, but are not limited to, an application running on a computing system, a system process, a logging engine, a logging server, and the like. Further, the log event may be indicative of an error message. In accordance with one implementation of the present subject matter, the log processing module 114 of the log categorization system 102 receives the real-time log event from one or more log sources.

At block 204, the method 200 includes processing the real-time log event to remove insignificant data from the real-time log event. Examples of insignificant data include timestamps, digits, and special characters. In one example, stop words, such as what, a, the, any, and the like, may also be removed from the log event as these stop words do not carry any significant information. According to an implementation, the log processing module 114 may process the real-time log event to remove insignificant data from the real-time log event.

At block 206, the method 200 includes computing a term frequency-inverse document frequency (TF-IDF) vector for the processed log event based on a pre-calculated TF-IDF matrix of a log corpus and a number of new words in the processed log event. The number of new words may not include the stop words. Further, the log corpus may include one or more pre-existing log events. In one implementation, the clustering module 116 may compute the TF-IDF vector for the processed log event.

At block 208, the method 200 includes determining a centroid matrix for the processed log event based on a pre-determined centroid matrix of the log corpus and the number of new words in the processed log event, where the pre-determined centroid matrix is determined based on a number of clusters in the log corpus. In other words, the pre-determined centroid matrix of the log corpus is adapted to suit the dimensions of the TF-IDF vector of the real-time log event to determine the centroid matrix. In one example, a cluster may be indicative of a log category. According to an implementation, the clustering module 116 determines the centroid matrix for the processed log event based on the pre-determined centroid matrix of the log corpus and the number of new words in the processed log event.

At block 210, the method 200 includes calculating a distance between the TF-IDF vector and a cluster centroid of each of the clusters. The log categorization module 120 calculates a distance between the TF-IDF vector and a cluster centroid of each of the clusters.

At block 212, the method 200 includes identifying, from amongst the clusters, a cluster having a closest cluster centroid based on the distance between the TF-IDF vector and the cluster centroid of each of the clusters, where the closest cluster centroid is a cluster centroid closest to the TF-IDF vector. In one example, the centroid, from the adapted k centroid set, with lowest dissimilarity to the log event is the closest centroid. According to an implementation, the log categorization module 120 identifies, from amongst the clusters, a cluster having a closest cluster centroid based on the distance between the TF-IDF vector and the cluster centroid of each of the clusters.

At block 214, the method 200 includes determining whether the distance between the TF-IDF vector and the closest cluster centroid is greater than a pre-determined silhouette threshold corresponding to the cluster. In one implementation, the log categorization module 120 determines whether the distance between the TF-IDF vector and the closest cluster centroid is greater than a pre-determined silhouette threshold corresponding to the cluster.

If it is determined that the distance between the TF-IDF vector and the closest cluster centroid is greater than the pre-determined silhouette threshold corresponding to the cluster with the closest cluster centroid, the method 200 proceeds to block 216 (Yes' branch). At block 216, the processed log event is categorized as a new log category. However, if at block 214, it is determined that the distance between the TF-IDF vector and the closest cluster centroid is less than the pre-determined silhouette threshold corresponding to the cluster with the closest cluster centroid the method 200 proceeds to block 218 (No' branch). At block 218 of the method 200, the processed log event is categorized into a pre-existing log category corresponding to the cluster. According to one implementation, the log categorization module 120 categorizes the processed log event into a new log category or a pre-existing log category.

As described earlier, for the purpose of categorizing the log event into the log category, the log categorization system 102 initially clusters the log corpus into one or more log categories.

In an implementation, initially a log corpus may be received from one or more log sources. The log corpus comprises one or more pre-existing log events. Subsequently, the log corpus is processed to remove insignificant data from each of the one or more pre-existing log events. Examples of the insignificant data include timestamps, digits, and special characters. Thereafter, a TF-IDF matrix of the log corpus is computed based on a number of pre-existing log events in the log corpus and a number of words in the log corpus.

Once the TF-IDF matrix is computed, a cluster model is generated based on the TF-IDF matrix. The cluster model is indicative of the number of clusters corresponding to the log corpus. In one example, a cluster may be indicative of a log category. Further, a centroid matrix of the log corpus is determined based on the number of clusters in the cluster model and the number of words in the log corpus. Subsequently, a cluster radius and a silhouette width of each cluster are calculated. Thereafter, a silhouette threshold is determined for each cluster based on the corresponding cluster radius and the corresponding silhouette width. Once the one or more log categories, the TF-IDF matrix, the centroid matrix, and the silhouette threshold for each cluster are determined, these are stored in a database.

Although embodiments for methods and systems for real-time categorization of log events have been described in a language specific to structural features and/or methods, it is to be understood that the invention is not necessarily limited to the specific features or methods described. Rather, the specific features and methods are disclosed as exemplary embodiments for real-time categorization of log events.

I claim:

1. A method for categorizing a real-time log event, the method comprising:
   computing a Term Frequency-Inverse Document Frequency (TF-IDF) matrix of a log corpus based on a number of pre-existing log events in the log corpus and a number of words in the log corpus;
   computing a Term Frequency-Inverse Document Frequency (TF-IDF) vector for the real-time log event based on a pre-calculated TF-IDF matrix of the log corpus and a number of new words in the real-time log event, wherein the log corpus comprises one or more pre-existing log events, and wherein the real-time log event is indicative of an error message;
   generating a cluster model based on the TF-IDF matrix, wherein the cluster model is indicative of a number of clusters corresponding to the log corpus, and wherein a cluster is indicative of a log category;
   determining a centroid matrix of the log corpus based on the number of clusters in the cluster model and the number of words in the log corpus;
   calculating a cluster radius and a silhouette width of each cluster, wherein the cluster radius of a cluster is calculated based on a distance between a cluster centroid of the cluster and a farthest point in the cluster; and wherein the silhouette width of the cluster is indicative of compactness of the cluster;
   determining a silhouette threshold for each cluster based on the corresponding cluster radius and the corresponding silhouette width;
   calculating a distance between the TF-IDF vector and the cluster centroid of each cluster in the log corpus;
   identifying, from amongst the clusters, a cluster having a closest cluster centroid based on the distance between the TF-IDF vector and the cluster centroid of each of the clusters, wherein the closest cluster centroid is a cluster centroid closest to the TF-IDF vector; and
   categorizing the real-time log event into one or more log categories based on a comparison of the distance between the TF-IDF vector and the closest cluster centroid with a pre-determined silhouette threshold corresponding to the cluster with the closest cluster centroid.

2. The method as claimed in claim 1 further comprising:
   receiving the real-time log event from one or more log sources; and
   processing the real-time log event to remove insignificant data from the real-time log event, wherein the insignificant data includes timestamps, digits, and special characters.

3. The method as claimed in claim 1 further comprising determining a centroid matrix for the real-time log event by adapting a pre-determined centroid matrix of the log corpus based on the number of new words in the real-time log event, wherein the pre-determined centroid matrix is determined based on the number of clusters in the log corpus.

4. The method as claimed in claim 1, wherein the one or more log categories include a pre-existing log category corresponding to the cluster and a new log category.

5. The method as claimed in claim 4, wherein, when the distance between the TF-IDF vector and the closest cluster centroid of the cluster is greater than the pre-determined silhouette threshold corresponding to the cluster, the real-time log event is categorized as the new log category.

6. The method as claimed in claim 4, wherein, when the distance between the TF-IDF vector and the closest cluster centroid of the cluster is less than the pre-determined silhouette threshold corresponding to the cluster, the real-time log event is categorized into the pre-existing log category.

7. The method as claimed in claim 1, wherein the method further comprising:

receiving the log corpus from one or more log sources, wherein the log corpus comprises one or more pre-existing log events;

processing the log corpus to remove insignificant data from each of the one or more pre-existing log events, wherein the insignificant data includes timestamps, digits, and special characters.

8. The method as claimed in claim 1, wherein the cluster model is generated based on a clustering algorithm, wherein the clustering algorithm is a spherical k-means clustering algorithm.

9. A log categorization system for categorizing a real-time log event, the log categorization system comprising:
a processor;
a clustering module coupled to the processor to,
computer a Term Frequency-Inverse Document Frequency (TF-IDF) matrix of a log corpus based on a number of pre-existing log events in the log corpus and a number of words in the log corpus;
compute a Term Frequency-Inverse Document Frequency (TF-IDF) vector for the real-time log event based on a pre-calculated TF-IDF matrix of a log corpus and a number of new words in the real-time log event, wherein the log corpus comprises one or more pre-existing log events, and wherein the real-time log event is indicative of an error message;
generate a cluster model based on the TF-IDF matrix, wherein the cluster model is indicative of the number of clusters corresponding to the log corpus, and wherein a cluster is indicative of a log category; and
determine the centroid matrix of the log corpus based on the number of clusters in the cluster model and the number of words in the log corpus;
a log categorization module coupled to the processor to,
calculate a cluster radius and a silhouette width of each cluster, wherein the cluster radius of a cluster is calculated based on a distance between a cluster centroid of the cluster and a farthest point in the cluster; and wherein the silhouette width of the cluster is indicative of compactness of the cluster;
determine a silhouette threshold for each cluster based on the corresponding cluster radius and the corresponding silhouette width;
calculate a distance between the TF-IDF vector and a cluster centroid of each cluster in the log corpus;
identify, from amongst the clusters, a cluster having a closest cluster centroid based on the distance between the TF-IDF vector and the cluster centroid of each of the clusters, wherein the closest cluster centroid is a cluster centroid closest to the TF-IDF vector; and
categorize the real-time log event into a log category based on a comparison of the distance between the TF-IDF vector and the closest cluster centroid with a pre-determined silhouette threshold corresponding to the cluster with the closest cluster centroid.

10. The log categorization system as claimed in claim 9, wherein the log category is one of a pre-existing log category and a new log category.

11. The log categorization system as claimed in claim 9, wherein the log categorization system further includes a log processing module coupled to the processor to:
receive the real-time log event from a log source; and
process the real-time log event to remove insignificant data from the real-time log event, wherein the insignificant data includes timestamps, digits, and special characters.

12. The log categorization system as claimed in claim 10, wherein the log categorization module categorizes the real-time log event into the pre-existing log category when the distance between the TF-IDF vector and the closest cluster centroid is less than the pre-determined silhouette threshold corresponding to the cluster with the closest cluster centroid.

13. The log categorization system as claimed in claim 10, wherein the log categorization module categorizes the real-time log event as the new log category when the distance between the TF-IDF vector and the closest cluster centroid is greater than the pre-determined silhouette threshold corresponding to the cluster with the closest cluster centroid.

14. The log categorization system as claimed in claim 9, wherein the clustering module determines a centroid matrix for the real-time log event by adapting a pre-determined centroid matrix of the log corpus based on the number of new words in the real-time log event, wherein the pre-determined centroid matrix is determined based on the number of clusters in the log corpus.

15. The log categorization system as claimed in claim 9, wherein the log processing module further:
receives the log corpus from one or more log sources, wherein the log corpus comprises one or more pre-existing log events; and
processes the log corpus to remove insignificant data from each of the one or more pre-existing log events, wherein the insignificant data includes timestamps, digits, and special characters.

16. A non-transitory computer-readable medium having embodied thereon a computer program for executing a method comprising:
computing a Term Frequency-Inverse Document Frequency (TF-IDF) matrix of a log corpus based on a number of pre-existing log events in the log corpus and a number of words in the log corpus;
computing a Term Frequency-Inverse Document Frequency (TF-IDF) vector for a log event based on a pre-calculated TF-IDF matrix of the log corpus and a number of new words in the log event, wherein the log corpus comprises one or more pre-existing log events, and wherein the log event is indicative of an error message;
generating a cluster model based on the TF-IDF matrix, wherein the cluster model is indicative of a number of clusters corresponding to the log corpus, and wherein a cluster is indicative of a log category;
determining a centroid matrix of the log corpus based on the number of clusters in the cluster model and the number of words in the log corpus;
calculating a cluster radius and a silhouette width of each cluster, wherein the cluster radius of a cluster is calculated based on a distance between a cluster centroid of the cluster and a farthest point in the cluster; and wherein the silhouette width of the cluster is indicative of compactness of the cluster;
determining a silhouette threshold for each cluster based on the corresponding cluster radius and the corresponding silhouette width;
calculating a distance between the TF-IDF vector and a cluster centroid of each cluster in the log corpus;
identifying, from amongst the clusters, a cluster having a closest cluster centroid based on the distance between the TF-IDF vector and the cluster centroid of each of the clusters, wherein the closest cluster centroid is a cluster centroid closest to the TF-IDF vector; and
categorizing the log event into one or more log categories based on a comparison of the distance between the TF-IDF vector and the closest cluster centroid with a pre-determined silhouette threshold corresponding to the cluster with the closest cluster centroid.

* * * * *